United States Patent [19]
Bieschke et al.

[11] Patent Number: 5,302,066
[45] Date of Patent: Apr. 12, 1994

[54] LOCKING FASTENER

[75] Inventors: Martin P. Bieschke, Rockford, Ill.; James A. Briney, Rochester, Ind.

[73] Assignee: Textron Inc., Providence, R.I.

[21] Appl. No.: 6,032

[22] Filed: Jan. 19, 1993

[51] Int. Cl.⁵ .......................................... F16B 37/04
[52] U.S. Cl. ................................... 411/181; 411/188; 411/399; 411/968
[58] Field of Search .............. 411/184, 181, 187, 179, 411/180, 959, 968, 176, 177, 188, 399

[56] References Cited

U.S. PATENT DOCUMENTS

| | | | |
|---|---|---|---|
| 2,138,409 | 11/1938 | Salter | 411/183 |
| 2,147,209 | 2/1939 | Olson | 411/187 |
| 2,415,695 | 2/1947 | Kann | 411/180 |
| 2,833,326 | 5/1958 | Knohl | 411/185 |
| 3,389,734 | 6/1968 | Gutshall | 151/37 |
| 3,393,724 | 7/1968 | Joffe | 411/180 X |
| 3,405,752 | 10/1968 | Neuschotz | 411/180 |
| 3,605,845 | 9/1971 | Junker | 151/37 |
| 3,910,331 | 10/1975 | Randall | 411/181 |
| 4,220,188 | 9/1980 | McMurray | 151/37 |
| 4,432,681 | 2/1984 | Capuano | 411/180 |
| 4,637,766 | 1/1987 | Milliser | 411/180 |
| 4,657,459 | 4/1987 | Landt | 411/188 |
| 4,808,050 | 2/1989 | Landt | 411/188 |
| 4,812,095 | 3/1989 | Piacenti et al. | 411/188 |
| 4,825,527 | 5/1989 | Ladouceur | 411/180 X |
| 4,940,375 | 7/1990 | Marvell et al. | 411/179 X |

FOREIGN PATENT DOCUMENTS 51013  5/1982  European Pat. Off. ............ 411/184

*Primary Examiner*—Rodney M. Lindsey
*Attorney, Agent, or Firm*—Trexler, Bushnell, Giangiorgi & Blackstone, Ltd.

[57] ABSTRACT

A locking fastener in accordance with the invention comprises a head or a nut body having a radially outer surface defining an outer periphery of selectible configuration and a height dimension defining an axial direction. A shank or a locking neck portion extends axially from the head or nut body and has a radially outer surface defining an outer diameter of smaller cross-sectional dimension than the outer periphery of the head or nut body. A substantially flat radially extending locking surface is defined on the head or nut body between the outer surface thereof and the outer surface of the shank or locking neck, and a plurality of raised locking ribs extend across at least a portion of the locking surface, each of the ribs being arranged angularly offset in a direction corresponding to the direction of rotation of the nut to attain advancement toward a clamped engagement, (viz. clockwise for a right hand thread and counterclockwise for a left hand thread) said angle being defined by the rib and a radial line which extends across the locking surface and intersects the rib.

19 Claims, 2 Drawing Sheets

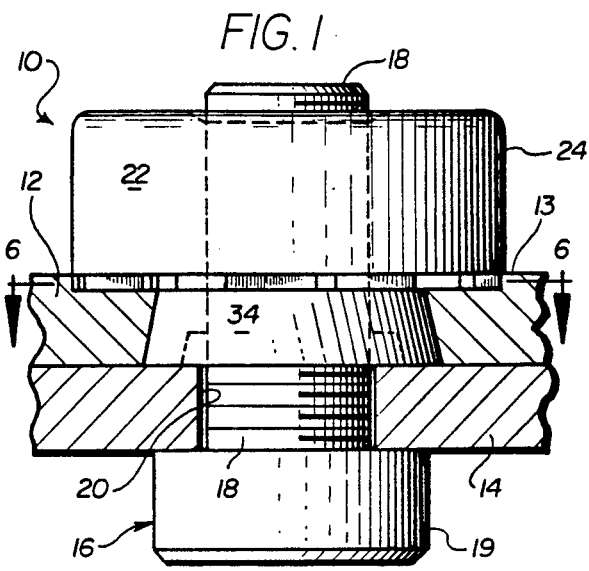
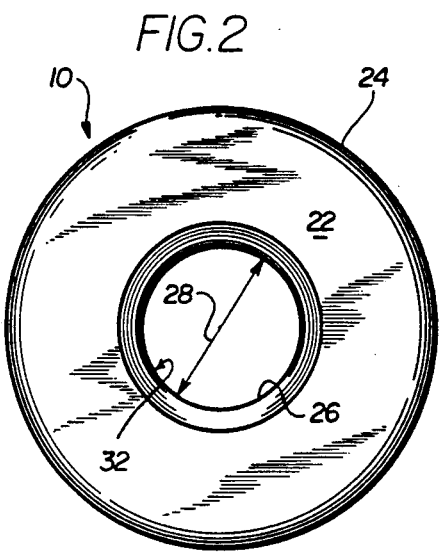
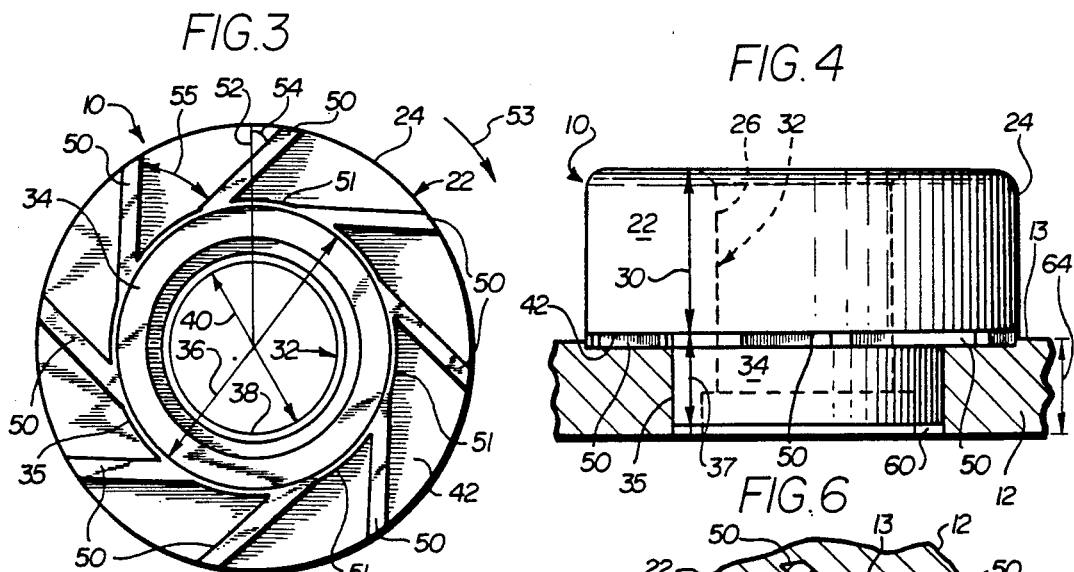

LOCKING FASTENER

BACKGROUND OF THE INVENTION

The invention concerns a novel and improved locking fastener, such as a lock nut, and more particularly a lock nut of a type which is adapted to be staked or otherwise fixed in engagement with an aperture through a generally flat workpiece to receive a threaded component, such as the shank of a screw-type fastener for affixing another structure or element to the workpiece. More particularly, the invention relates to a novel lock nut having a configuration for positively holding the lock nut in engagement with the workpiece and against rotation in response to advancement and rotation of a mating fastener with respect to the lock nut for advancing and seating relative thereto, for securing together of the workpiece and other element or structure.

A serious problem in joints secured together by threaded members is the possibility of joint separation due to one or both of the mating threaded members backing off. Generally, this can occur when the joint and fasteners are subjected to vibration.

Similarly, in joints utilizing a lock nut of the type which is physically affixed or secured to a workpiece or to one of the members to be secured together to form the secured joint, rotation of the nut member during driving and seating of a mating screw-type fastener should be avoided. Heretofore, such rotation has generally been opposed by the force of crimping wherein a locking neck or similar extending member or portion of the nut member is physically crimped, usually by a cold forming or deformation type of operation, to the workpiece or other member to which it is to be secured. While such crimping or staking forces may reliably hold the nut in engagement with the workpiece or other member, the crimping is usually done by generally axially applied forces, such that the lock nut may not reliably resist rotational forces.

More specifically, the lock nut may have some neck or other extension which extends through an aperture in a workpiece and which is deformed or crimped over to engage the nut with the workpiece such that it cannot be easily withdrawn. However, the lock nut may remain engaged with the through opening and yet be subject to rotation relative to the workpiece, either through initial inadequate application of crimping force to oppose rotation, or later loosening of the crimping or staking parts or portions. Such loosening may not be sufficient to permit withdrawal or disengagement of the lock nut from the workpiece but yet be sufficient to permit some amount of rotation thereof. When permitted some degree of rotational movement, the nut may later vibrate excessively when subjected to vibrational forces, thereby loosening the secured joint.

Such rotational forces are particularly brought to bear upon engagement and driving of a mating threaded screw-type fastener relative to the lock nut. Particularly in applications where relatively high torque is used to seat the mating fastener, relatively high torque forces may also be transmitted to the lock nut, particularly during the latter part of the driving and final seating of the threaded mating fastener relative to the lock nut.

It has been heretofore proposed to provide various generally radially extending projections, ribs or serrations on the underhead surfaces of screw-type fasteners, as well as on the surfaces of nuts which face the workpiece surface. However, the purpose of these serrations has been to prevent rotation of both screw and nut members after securing of the joint, for example in response to vibration or the like. As such, such serrations or other gripping structures have generally been arranged in a counterclockwise direction in order to resist rotational forces in a counterclockwise direction which would tend to cause relative disengagement of the screw and nut.

In contrast, the present invention recognizes, that in order to avoid rotation during driving of the screw relative to the nut, it is just the opposite, that is, clockwise rotational forces which are experienced and are to be resisted by the lock nut. Moreover, it is not believed that such locking serrations have been proposed heretofore with respect to a lock nut, i.e., of the type which is positively engaged with a workpiece or other member to be joined by the lock nut and mating fastener.

The above discussion relates to a generally standard thread arrangement where the fastener has a right hand thread. Of course, if the fastener system uses the less conventional left hand thread, the orientation of the ribs for a system in accordance with the present invention would be opposite, that is the ribs would be disposed counterclockwise.

OBJECTS AND SUMMARY OF THE INVENTION

Accordingly, it is a general object of this invention to provide a novel and improved lock nut.

A related object is to provide an improved lock nut which positively resists rotation during driving and, seating of a mating fastener.

Briefly, and in accordance with the foregoing objects, a locking fastener in accordance with the invention comprises a head or a nut body having a radially outer surface defining an outer periphery of selectible configuration and a height dimension defining an axial direction; a shank or a locking neck portion extending axially from said head or nut body and having a radially outer surface defining an outer diameter of smaller cross-sectional dimension than said outer periphery of said head or nut body; a substantially flat radially extending locking surface defined on said head or nut body between said outer surface thereof and said outer surface of said shank or locking neck, and a plurality of raised locking ribs extending across at least a portion of said locking surface, each of said ribs being arranged angularly offset at a clockwise angle relative to a radial line which extends across said locking surface and intersects said rib, for a standard right hand thread. Conversely, for a left hand thread, the ribs are disposed oppositely.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawings in which like reference numerals identify like elements, and in which:

FIG. 1 is an elevation, taken partly in section, and illustrating a pair of generally flat workpieces being joined by a threaded fastener and a mating lock nut, the lock nut being configured in accordance with the present invention;

FIG. 2 is a top plan view of the lock nut of the invention;

FIG. 3 is a bottom plan view of the lock nut of the invention;

FIG. 4 is an elevation, partially in section showing an initial phase of installation of the lock nut relative to a workpiece;

FIG. 5 shows completion of installation of the lock nut relative to a workpiece;

FIG. 6 is a sectional view taken generally in the plane of the line 6—6 of FIG. 1;

DETAILED DESCRIPTION OF THE EMBODIMENT

Figure 7:
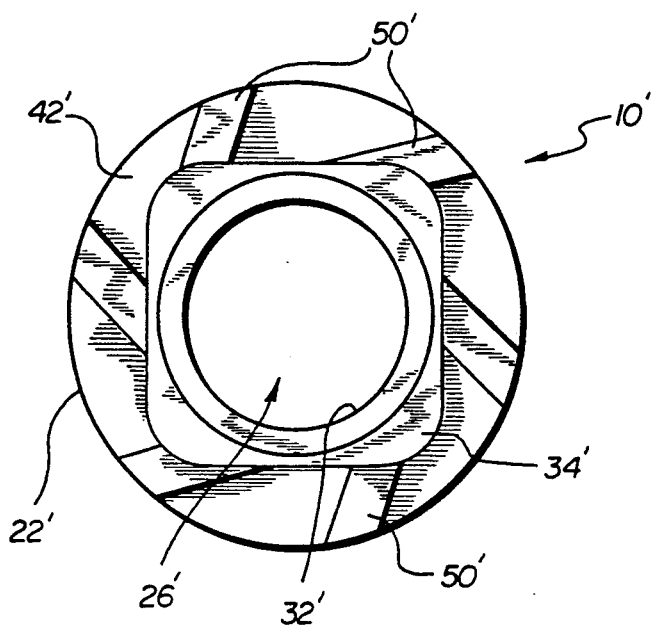
FIG. 7 is a view similar to FIG. 3 and illustrating a modified version of the invention wherein the locking neck is polygonal.

Referring now to the drawings, a locking fastener in accordance with the invention is illustrated in the form of a lock nut 10 in each of the figures of drawing. While the preferred embodiment of the invention as shown in the drawings is the lock nut 10, the features of the invention could be provided on an externally threaded stud or bolt type fastener. In FIG. 1, the lock nut 10 is shown in an exemplary installation, affixed to a relatively thin, flat, apertured workpiece 12 to which a second similar apertured workpiece 14 is to be secured. The workpieces 12, 14 are secured together by means of threaded engagement of lock nut 10 with a mating threaded screw-type fastener 16. It will be seen that the fastener 16 has an elongate threaded shank 18 which extends through a complimentary aperture 20 in the workpiece 14 and also extends through and threadibly engages the lock nut 10.

To this end, the lock nut 10 comprises a generally tubular nut body 22 having a radially outer surface 24 which defines an outer periphery which may be of any selected configuration. In the illustrated embodiment the outer periphery 24 is generally cylindrical in form, however, other shapes or configurations may be selected without departing from the invention.

A radially inner surface 26 of the nut body 22 defines an inner diameter 28 and a height dimension 30 of the nut body generally defines an axial direction or axis thereof. The inner surface 26 is configured for mating threaded engagement with the externally threaded shank 18 of the screw-type fastener 16 which also has an enlarged driver head portion 19. Thus, this inner surface 26 is generally cylindrical, defining diameter 28 and has a mating screw-type thread as indicated generally by reference numeral 32. The respective threads in the illustrated embodiment are conventional or standard right hand threads.

Referring now also to FIGS. 3 and 4, projecting from the nut body 22 is a substantially annular locking neck portion 34 which has a radially outer surface 35 defining an outer diameter 36 of smaller cross-sectional dimension than the outer surface 24 of the nut body 22. The locking neck portion 34 also has a generally cylindrical radially inner surface 38 defining an inner diameter 40 substantially identical to and coaxial with the inner diameter 28 of the nut body. The thread 32 also extends into and through the inner surface 38 of the locking neck portion 34. A substantially flat radially extending locking surface 42 is defined between the outer surface 24 of the nut body and the outer surface 35 of the locking neck portion 34. In the preferred embodiment illustrated, the locking neck 34 is of a one-piece integrally formed construction with the nut body 22 and is cylindrical. In the embodiment of FIG. 7 to be discussed hereinafter the locking neck portion is polygonal and preferably square.

In accordance with an important feature of the invention, a plurality of raised locking ribs 50 are formed extending across at least a portion of the locking surface 42. Each of these ribs is arranged angularly offset at a clockwise acute angle when surface 42 is viewed in plan as in FIG. 3, relative to a radius of the nut body which extends across the locking surface and intersects the rib. Such a radius is indicated for example by reference numeral 52. It will be seen that radius 52 intersects an upper-most rib 50 in FIG. 3 such that this rib 50 defines the acute clockwise angle 54 with respect to radius 52.

Accordingly, it will be seen that the ribs 50 have a generally clockwise orientation, whereby when these ribs are engaged with the material of the workpiece 12, as indicated for example in FIG. 5 and FIG. 6, they resist clockwise rotation of the nut. This clockwise direction is defined when viewed as indicated in FIG. 3 at 53, that is from the direction of entry of the screw-type fastener 16. The ribs 50 tend to partially deform and securely engage the material of the workpiece 12 to resist rotation of the nut 10 in response to the driving and seating of the screw 16 relative to the nut 10 during securement of workpiece 14 relative to workpiece 12.

The ribs 50 as shown in FIG. 3 are substantially tangential to the outer surface 35 of the locking neck 34 and extend from substantially this outer surface 35 outwardly across surface 42 toward the outer surface 24 of the nut body 22.

As best viewed in FIG. 4 and 5, it will be seen that the locking neck 34 has an axial dimension or height 37, which is shown in FIG. 4 in its initial or undeformed state, that is prior to full engagement with workpiece 12. As indicated in FIG. 4, the ribs 50 are just beginning to be engaged with and correspondingly deform the material on a facing surface 13 of the workpiece 12. A suitable tool (not shown) is utilized to forcibly axially engage the lock nut 10 with the workpiece 12.

As shown in FIG. 5, upon full engagement the locking neck 34 is forcibly deformed (by the aforesaid tool) in such a manner that it expands in a radially outwardly divergent matter to generally form a frustoconical configuration. In this configuration, the locking neck 34 positively engages and locks with a receiving through aperture 60 of the workpiece 12. Hence, the locking neck initially has an axial length 37 either similar to or somewhat greater than a thickness dimension 64 of the workpiece 12 to which the lock nut is to be affixed. The locking neck 34 is extendable through the through opening 60 in the workpiece such that its axial end part is deformable for gripping engagement with the surface of the workpiece about the through opening 60.

In the illustrated embodiment, the raised locking ribs 50 are straight or linear and are symmetrically arranged about the locking surface 42. Moreover, each rib extends from substantially the outer surface 24 of the nut body 22 inwardly and tangential to the outer surface 35 of the locking neck 34 and terminates substantially at an intersection with the next adjacent one of the locking ribs. It will be seen, however, that when the locking ribs 50 reach the outer surface 35 of the locking neck 34, they tend to merge generally into the locking neck leaving only a small raised rim portion 51 extending toward and to an intersection with the next adjacent locking rib 50.

Hence, the operative portions of the locking ribs as such extend substantially from the outer periphery 35 of the locking neck 34 to the outer surface 24 of the nut body 22. In the illustrated embodiment, the ribs 50 are preferably are eight (8) in number, and moreover, each of the ribs defines or forms an angle of substantially 45 degrees (45°) with respect to the next adjacent rib as indicated at 55.

Figure 8:
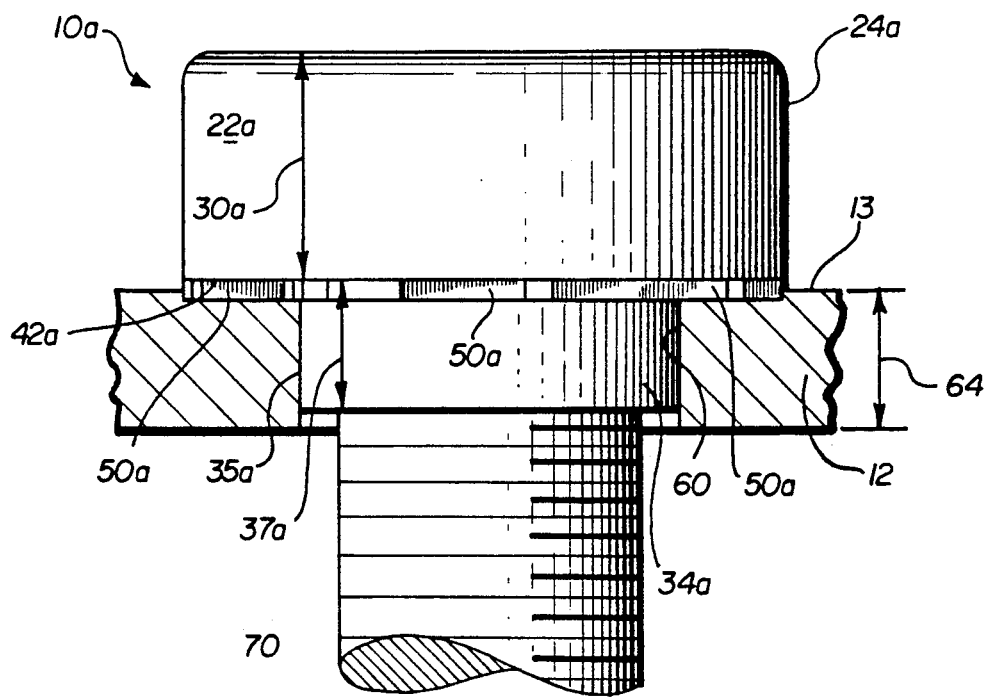
FIG. 8 is a view similar to FIG. 4 and illustrating a modified version of the invention wherein the locking fastener of the invention comprises an externally threaded fastener.

The invention might also be embodied in an externally threaded stud or bolt type fastener. FIG. 8 shows such an externally threaded fastener 10a, in which like parts to the fastener previously described with reference to FIGS. 1–6 are indicated by like reference numerals with the suffix a. An externally threaded shank is indicated at reference number 70. Again, it should be noted that the invention has been illustrated and described in conjunction with a conventional right hand thread system. It is to be understood that it is equally applicable to a left hand threaded system, requiring only that the ribs be arrayed counterclockwise.

With reference to FIG. 7, a modified form of the invention is illustrated. In this regard, the nut 10' of FIG. 7, differs from that of FIG. 3 primarily only with respect to the configuration of the locking neck portion 34'. That is, the nut 10' includes a generally tubular body 22' having a centrally located bore 26' with an internal thread 32'. Also the undersurface or locking surface 42' of the nut includes a plurality of raised locking ribs 50' disposed in an arcuate clockwise array. The locking neck portion 34' of this embodiment however is polygonal and preferably square for disposition in a correspondingly shaped aperture formed in the associated workpiece (not shown). The use of a polygonal or square locking neck 34' and receiving aperture 60' (not shown) provides additional resistance to torque and firmly locks the nut 10' against rotation upon engagement of a thread bolt in the threaded aperture 26'.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

We claim:

1. A lock nut comprising: a generally tubular nut body having a radially outer surface defining an outer periphery of selectible configuration, a generally cylindrical radially inner surface defining an inner diameter, and a height dimension defining an axial direction, said inner surface being threaded and configured for mating threaded engagement with an externally threaded shank of a screw-type fastener; a substantially annular locking neck portion extending axially from said nut body and having a radially outer surface defining a smaller cross-sectional dimension than said outer periphery of said nut body and a generally cylindrical radially inner surface substantially coaxial with said nut body radially inner surface and defining an inner diameter substantially identical to said inner diameter of said nut body; a substantially flat radially extending locking surface defined on said nut body between said outer surface of said nut body and said outer surface of said locking neck, and a plurality of raised locking ribs extending across at least a portion of said locking surface, each of said ribs being arranged at an acute angle angularly offset in a direction corresponding to the direction of rotation of a fastener for mating with the nut to attain advancement toward a clamped engagement, said acute angle being defined by the rib and a radial line extending across said locking surface and intersecting said rib; and each of said ribs being substantially rectangular in cross-section.

2. A lock nut according to claim 1 wherein said locking neck is of a one-piece integrally formed construction with said nut body.

3. A lock nut according to claim 1 wherein said ribs are substantially tangential to said outer surface of said locking neck and extend from substantially said outer surface of said locking neck outwardly toward said outer periphery of said nut body.

4. A lock nut according to claim 1 wherein said locking neck has a axial length similar to the thickness of a workpiece to which the lock nut is to be affixed, said locking neck being extendable through a through opening in said workpiece of similar diameter to the outer diameter of said locking neck, such that an axial end part of said locking neck is deformable for gripping engagement with a surface of the workpiece about said through opening.

5. A lock nut according to claim 1 wherein said ribs are symmetrically arranged about said locking surface.

6. A lock nut according to claim 1 wherein said ribs are disposed generally tangentially to said annular locking neck portion.

7. A lock nut according to claim 1 wherein each of said locking ribs extends from substantially said outer periphery of said nut body inwardly and substantially tangentially to said outer surface of said locking neck, and terminates substantially at an intersection with a next adjacent one of said locking ribs.

8. A lock nut according to claim 1 wherein each of said ribs defines an angle of substantially 45° relative to the next adjacent rib.

9. A locking fastener according to claim 1, wherein a radially outer periphery of said locking neck is substantially circular.

10. A locking fastener according to claim 1, wherein a radially outer periphery of said locking neck is polygonal.

11. A locking threaded fastener comprising: a fastener head having a center and a radially outer surface defining an outer periphery of selectible configuration and a height dimension defining an axial direction; a generally cylindrical shank portion extending axially from said head and having a radially outer surface defining an outer diameter of smaller cross-sectional dimension than said outer periphery of said head; a substantially flat radially extending locking surface defined on said head between said outer surface of said head and said outer surface of said shank, and a plurality of raised locking ribs extending across at least a portion of said locking surface, each of said ribs being arranged at an acute angle angularly offset in a direction corresponding to the direction of rotation of a fastener for mating with the locking threaded fastener to attain advancement toward a clamped engagement, said acute angle being defined by the rib and a radial line extending across said locking surface and intersecting said rib; and each of said ribs being substantially rectangular in cross-section.

12. A locking fastener according to claim 11 wherein said ribs are symmetrically arranged about said locking surface.

13. A locking fastener according to claim 11 wherein said ribs are disposed generally tangentially to said shank.

14. A locking fastener according to claim 11 wherein each of said locking ribs extend from substantially said outer periphery of said head inwardly and substantially tangentially to said outer surface of said shank, and terminates substantially at an intersection with a next adjacent one of said locking ribs.

15. A locking fastener according to claim 11 wherein each of said ribs defines an angle of substantially 45° relative to the next adjacent rib.

16. A locking fastener according to claim 11 wherein said fastener is a nut having an internally threaded bore.

17. A locking fastener according to claim 11 wherein said fastener includes an externally threaded shank.

18. A locking fastener according to claim 11 wherein said head is of a one-piece integrally formed construction with said shank.

19. A locking fastener according to claim 11 wherein said ribs are substantially tangential to said outer surface of aid shank and extend from substantially said outer surface of said shank outwardly toward said outer periphery of said head.

* * * * *